United States Patent [19]

Daniels

[11] 4,166,284
[45] Aug. 28, 1979

[54] READ/WRITE HEAD-POSITIONING APPARATUS

[76] Inventor: Kenneth M. Daniels, 125 Roberta Dr., Woodside, Calif. 94062

[21] Appl. No.: 926,805

[22] Filed: Jul. 21, 1978

[51] Int. Cl.$^2$ .................. G11B 21/08; G11B 5/55; H02K 41/02
[52] U.S. Cl. ....................................... 360/106; 310/13
[58] Field of Search .................. 360/106, 78; 310/13, 310/27

[56] References Cited

U.S. PATENT DOCUMENTS

| | | | |
|---|---|---|---|
| 3,074,269 | 1/1963 | Wohl | 310/27 |
| 3,417,269 | 12/1968 | Heller et al. | 310/27 |
| 3,586,891 | 6/1971 | Applequist et al. | 310/13 |

*Primary Examiner*—Robert S. Tupper
*Attorney, Agent, or Firm*—Schatzel & Hamrick

[57] ABSTRACT

A read/write head-positioning apparatus for positioning one or more heads in a disk recorder and including a magnetic stator assembly having a coaxial, longitudinally-extending, annular coil-receiving cavity and a pair of longitudinally-extending, air bearing forming passageways provided therein, and an armature assembly including a pair of main bearing shafts disposed to pass through the passageways and a member affixed to the shaft ends for carrying a cylindrical coil support adapted to carry a drive coil within the coil-receiving cavity and for receiving the head-carrying arms. A pump is coupled to the stator assembly to create an air bearing flow in the passageways around the main bearing shafts so that electromagnetic interaction between the drive coil and the magnetic stator assembly can be used to position the recording heads with a minimum of frictional resistance.

10 Claims, 5 Drawing Figures

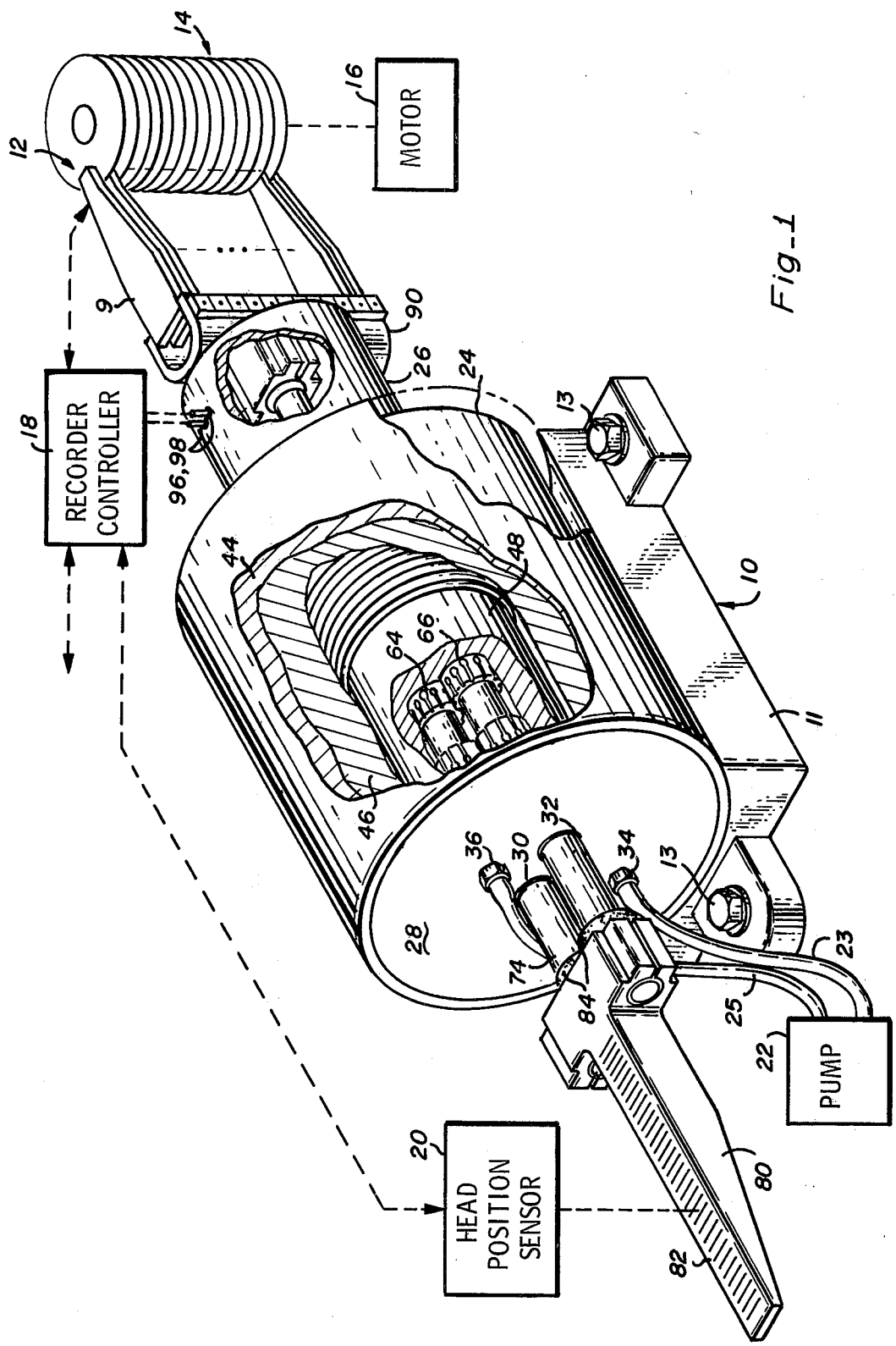
Fig_1

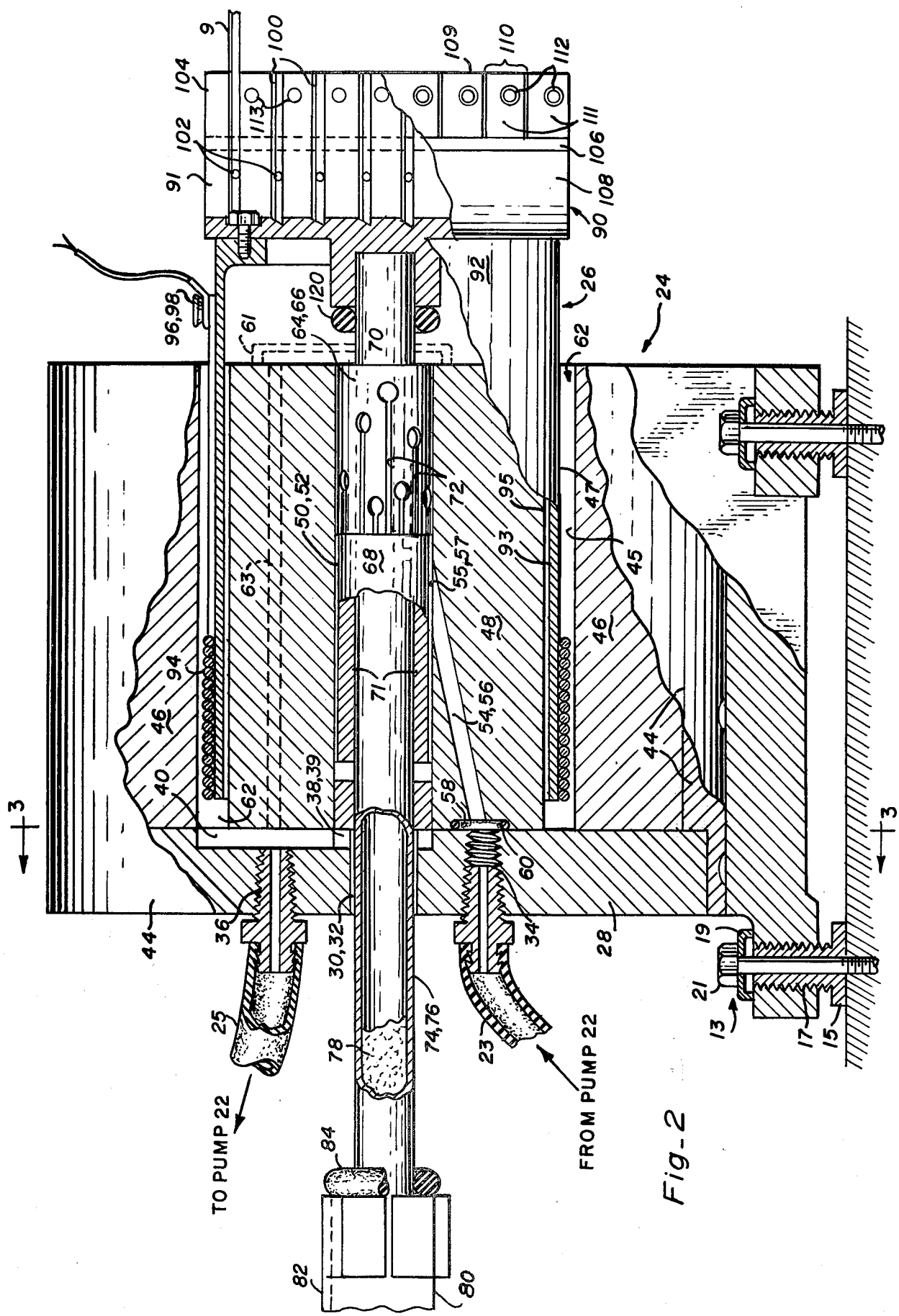

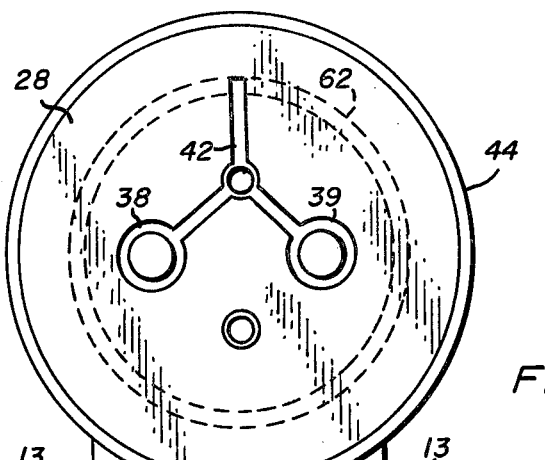
Fig_3
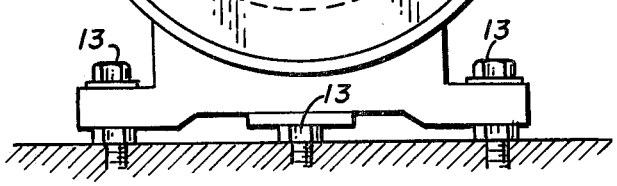
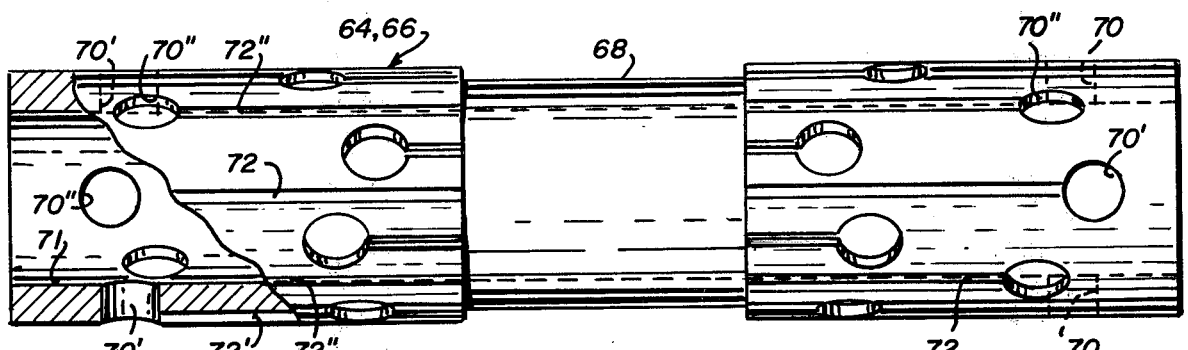
Fig_4
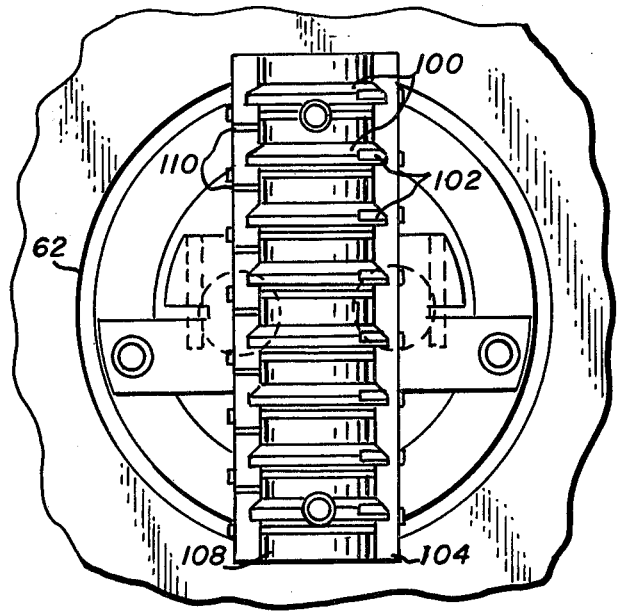
Fig_5

READ/WRITE HEAD-POSITIONING APPARATUS

BACKGROUND OF THE INVENTION

1. Field of the Invention

The present invention relates to disk recorders in general and more particularly to an improved read/write head-positioning apparatus wherein the head-carrying portion is suspended upon fluid bearings and driven by a coaxial motor.

2. Description of the Prior Art

In order to store electrical signals representing, for example, computer data or television type video information, disk type video recorders are often employed. As the name implies, disk recorders employ one or more platter-shaped disks. The surface of each disk is of suitable material such that a read/write head which is maintained in proximity therewith may be used to selectively magnetize portions of the disk surface as the disk is rotated. To effectively utilize the entire surface of the disk, the disk is most commonly divided into a number of imaginary concentric rings or tracks, or it is divided into one long spiral track, either of which may be accessed by the read/write head when it is suitably positioned along a path which corresponds to a radial line of the disk.

It is no doubt apparent that the performance characteristics of a disk type recorder are determined in large part by how rapidly and accurately the read/write head may be positioned. To this end a number of read/write head-positioning apparati have been developed. One such apparatus employs a motor driven screw for selectively positioning a read/write head-carrying carriage. Although effective in head position, the apparatus is relatively slow.

Another prior art read/write head-positioning apparatus employs a carriage which engages a pair of guide rails through a number of bearings. A motor which is comprised of an electrically actuated coil that interacts with a magnetic field, develops a force which is used to drive the carriage along the rails.

Because the motor, and thus the positioning force developed by the motor, is offset with respect to the drag force developed between the carriage and the rail, a rotational moment is developed. As a consequence, this prior art head-positioning apparatus suffers from the major disadvantage that as the carriage is driven by the motor, an up/down rocking, or pitching, action of the carriage occurs which causes the read/write head to bounce up and down on the disk.

Additionally, an unbalanced perpendicular force is developed by the air pressure which is commonly employed to float the read/write heads. The force develops a moment which causes a yawing action of the carriage and thus the heads. By preloading the bearings, these problems are reduced as well as permitting the use of lower tolerance parts. Unfortunately, the preloading force develops a frictional force which reduces the accuracy of the head-positioning apparatus. In addition, this frictional force degrades the response time of the apparatus which is already relatively slow due to its relatively large mass.

Finally, this last mentioned prior art, head-positioning apparatus employs a relatively large number of high tolerance parts which require careful assembly and alignment. In other words, not only must the rails be aligned in direction and height with respect to the disk, but the rails must be aligned to the carriage, the motor aligned to the rails and the coil aligned to the motor.

SUMMARY OF THE PRESENT INVENTION

It is therefore a primary object of the present invention to provide a read/write head-positioning apparatus in which the head-positioning forces and the supporting frictional forces are balanced about a single longitudinal axis so as not to induce head pitching as the head is moved back and forth.

Another object of the present invention is to provide a read/write head-positioning apparatus in which frictional forces are of nominal effect.

Other objects of the present invention are to provide a read/write head-positioning apparatus, the driving member of which has relatively low mass; to provide a head-positioning apparatus which requires the use of relatively few high tolerance parts; and to provide a head-positioning apparatus which is relatively easy to assemble and align.

Briefly, a preferred embodiment of the present invention includes a cylindrical permanent magnet stator assembly having a coaxial, longitudinally-extending, annular coil-receiving cavity and a pair of longitudinally-extending, air bearing forming passageways provided therein, and an armature including a pair of main bearing shafts disposed to pass through the passageways and having a member affixed to one end thereof which secures the shaft ends together, transports a coil support cylinder adapted to carry a drive coil within the coil-receiving cavity, and which is adapted to receive the head-carrying arms. A pump is coupled to the stator assembly to create an air bearing flow around the main bearing shafts so that electrical energization of the drive coil causes the armature assembly and the heads carried thereby to move substantially free of mechanical friction.

Since the armature driving forces are more or less concentric with any frictional support forces, the tendency to induce head pitching upon repositioning movement is virtually eliminated.

Another advantage of the present invention is that it includes a relatively light weight armature which can be rapidly and accurately positioned.

Still another advantage of the present invention is that the head-positioning apparatus uses few high tolerance parts, is easy to assemble and align, and can be manufactured at a relatively low cost.

These and other objects and advantages of the present invention will no doubt become apparent to those skilled in the art after having read the following detailed description of a preferred embodiment which is illustrated in the several figures of the drawing.

IN THE DRAWING

FIG. 1 is a partially broken perspective view schematically showing a disk recorder assembly including a read/write head-positioning apparatus in accordance with the present invention.

FIG. 2 is a partially broken side elevational view of the read/write head-positioning apparatus illustrated in FIG. 1;

FIG. 3 is a cross sectional view (at reduced scale) taken along th line 3—3 of FIG. 2;

FIG. 4 is a side elevational view showing one of the air bearing sleeves of the read/write head-positioning apparatus illustrated in FIGS. 1 and 2; and FIG. 5 is a partially broken end view of the apparatus shown in FIGS. 1 and 2.

DETAILED DESCRIPTION OF THE PREFERRED EMBODIMENT

Referring now to FIG. 1 of the drawing, a disk recorder system is schematically shown to include a head-positioning apparatus illustrated generally at 10 for simultaneously positioning a plurality of magnetic heads 12 relative to a corresponding plurality of recording disks 14 which are driven at a constant speed by a motor 16. A recorder/controller 18 inputs and outputs data to and from the heads 12 and generates control signals for input to the head-positioning apparatus 10 as well as monitoring its positional status by means of a head position sensor 20. A pump 22 is provided for supplying pressurized air or other fluid to the apparatus 10 as will be explained in more detail below.

Since the present invention deals primarily with the positioning apparatus 10, the stack of magnetic recording disks 14, the motor 16, the recorder/controller 18 and the head position sensor 20 are merely shown by schematic representation as an aid to the understanding of the subject apparatus.

Referring now additionally to FIG. 2 of the drawing which is a partially broken side elevation, it will be noted that the apparatus 10 is comprised generally of a stator assembly 24 which may be secured to a supporting chassis by a three-point alignment pad 11, an armature assembly 26 and a pump 22. The alignment pad 11 is affixed to the bottom of the stator assembly and includes three adjustable leveling and fastening assemblies 13, the components of which are shown in FIG. 2. More particularly, the assemblies 13 includes a threaded leveling screw 15 which is threaded into a tapped opening 17 in a leg of pad 11, a relieved locking cap 19 for engaging the top of the pad leg, and a hold-down bolt 21 which extends through cap 19 and screw 15, and threads into the system chassis. By loosening the bolts 21 and adjusting appropriate ones of the screws 15, the apparatus 10 can be aligned so that the heads 12 track properly as they move across the recording disks 14.

The stator assembly 24 is comprised of a circular backing plate 28 having a pair of main bores 30 and 32 which are disposed on opposite sides of the center of plate 28 and at equal distances therefrom. Disposed below the bores 30 and 32 is another tapped bore 36. As illustrated more clearly in FIG. 3, on the inside face of plate 28, annular grooves 38 and 39 contiguous with and circumscribing the bores 30 and 32, respectively, are provided along with Y-shaped groove 40 which interconnects grooves 38 and 39 with bore 36, and also interconnects bore 36 to the one end of an annular cavity 62 which is described below.

Affixed to the outer perimeter of plate 28 is a cylindrical outer housing 44 which contains and provides support for a plurality of elongated bar magnets 46 which are contiguously arrayed around the inner surface thereof. Alternatively, an array of electromagnetic windings could be substituted for the bar magnets. Secured to the center of plate 28 by suitable means that are not shown is an elongated cylinder 48 which has a pair of bores 50 and 52 extending therethrough. These bores are of a larger diameter than but are concentric with the bores 30 and 32, respectively. Also provided in the cylinder 48 are a pair of bored passageways 54 and 56, which respectively extend from the bore 34 to the central parts of the bores 50 and 52. A shallow oversized recess 58 is also provided at the ends of passageways 54, 56, as indicated, for accommodating a resilient O-ring 60 which provides an air-tight seal around the communicating bores.

The outer diameter 47 of cylinder 48 is less than the inner diameter 45 of the field magnet annulus 46 by a predetermined amount so as to form an annular cavity 62 which is open on the right-most side as illustrated, and is closed at its left-most extremity by plate 28.

Disposed within the bores 50 and 52 are sleeves 64 and 66 of the type further illustrated in FIG. 4 of the drawing. The sleeves 64 and 66 are in the form of elongated tubes having an annular groove 68 formed in the outer circumference thereof at their midsections and a plurality of pairs of holes 70, 70', 70'', etc., provided therein. As will be noted, each of the holes in a particular pair are in diametrically opposite sides of the tube and each pair of holes is both radially and axially spaced relative to the adjacent pair of holes. In the preferred embodiment, no more than one pair of holes is provided in any plane transverse to the sleeve. However, it is understood that in alternate embodiments more than two holes could be provided in a particular transverse plane. From each of the holes 70, a longitudinally-extending groove 72 is provided so as to connect the hole with the annular groove 68.

The external diameter of the sleeves 64 and 66 is made slightly larger than the diameter of the bores 50 and 52 so that when inserted therein, an interference fit will be effected. The holes 70 are of uniform volume and the grooves 72 are of the same width and depth. In the preferred embodiment, the grooves 72 are approximately 0.030 inch in width and 0.007 inch in depth. Although a 32-hole array of holes is shown, it will be understood that any pattern of holes that are balanced along the length of the sleeve may be used.

The armature 26 is comprised of a pair of main bearing shafts 74 and 76 which have smooth outer surfaces and extend through the sleeves 64 and 66. The outer diameters of the shafts 74 and 76 are slightly less than the inner diameters of sleeves 64 and 66 so that sufficient fluid can flow therebetween to provide separating lubrication. The shafts 74 and 76 in the preferred embodiment are made of tubular stock and may be either hollow or filled with a chemical foam or other plastic material 78 to provide vibration damping.

Attached to one end of the shafts 74 and 76 is a member 80 which serves the dual purpose of rigidly clamping the shaft ends together at a predetermined spacing and providing a means by which the armatures position relative to the sensor 20 can be determined. This, of course, allows the position of the heads 12 relative to the disks 14 to be known. As indicated in FIG. 1, a series of equally-spaced indicia are provided at 82 which can be optically sensed by the sensor 20. It will, of course, be appreciated that any other suitable means for sensing the longitudinal position of the armature could be utilized.

Disposed about the shafts 74 and 76, adjacent the bracket 80 are resilient over-travel bumpers 84 which provide crash stops in the event that control of the armature is lost in the forward direction. Springs or other suitable alternative means may, of course, be used.

Attached to the opposite end of the shafts 74 and 76 is a member 90 which likewise serves to rigidly affix the two ends of the shafts together at a precise spacing. However, the member 90 also provides a means for carrying the coil support cylinder 92 and provides a carriage means 91 to which the head supporting arms 9 may be mounted.

The coil support 92 is a cylinder of aluminum or other lightweight, nonmagnetic material having an inner diameter 93 slightly larger than the outer diameter 95 of the center pole 48, and an outer diameter small enough so that the drive coil winding 94 wound thereabout may be freely passed within the cavity 62. For connection convenience, the ends of the winding 94 are connected to terminals 96 and 98 carried by the coil support cylinder.

The carriage means 91 has a generally U-shaped inner wall that extends vertically from top to bottom and has a plurality of horizontal grooves 100 provided therein for receiving the side edges of the arms 9. As further indicated in FIG. 5, the grooves 100 are cut with a chamfered top edge so as to provide a clamping keyway for receiving the arms 9, and stop pins 102 pass through the wall 104 so as to provide an accurate terminus for each arm-receiving groove.

As further indicated in FIGS. 1 and 2, a vertical relief groove 106 is provided in the outer surface of the wall 108 and horizontal slits 110 extend from the distal wall edge 109 to relief groove 106 so as to divide the indicated wall portion into a plurality of deformable clamping members 111 which can be closed against the side edges of received arms by means of bolts 112 which pass through openings in the wall segments 111 and are threaded into tapped openings 113 in the wall 104.

As at the opposite end of the shafts 74 and 76, annular resilient over-travel bumpers 120 are also disposed about the shafts 74, 76, to provide crash stops in the event that control of the armature is lost in the retracting direction.

Referring now again to FIGS. 2 and 3, it will be noted that with the apparatus assembled as illustrated, a fluid flow path is provided from pressure input bore 34 and through the bores 54 and 56 to the chambers 55 and 57 which are formed between the surfaces 68 of the sleeves 64 and 66 and the wall of bores 50 and 52, respectively. Since the larger diameter surfaces of the sleeves 64, 66, are tightly pressed against the walls of bores 50, 52, the grooves 72 provide well-defined passageways leading from the chambers 55, 57, to the openings 70. And since the shafts 74, 76, are loosely received within the inner diameter 71 of the sleeves 64, 66, the openings 70 will provide balancing chambers through which pressurized fluid may exit and apply balancing forces to opposite sides of the respective shafts, thereby maintaining them centered relative to the sleeves.

Accordingly, by applying an air pressure of approximately 5 psi from pump 22 to the openings 70 via the tube 23, the bore 34, the bores 54, 56, the chambers 55, 57, and the grooves 72, the shafts 74, 76, may be centered with the sleeves 64, 66, and by virtue of the flow of air pressure thereabout may be moved through the sleeves virtually free of contact friction.

Although suitable clearance may be provided around the shafts at the bores 30, 32, and through the cavity 62 around the coil and its support 92 so as to allow bearing air to be discharged into the ambient environment, for those applications in which it is desirable that the pressurizing fluid not be discharged into the ambient, means such as the grooves 38, 39 and 40, and their associated passageway may be utilized to collect the lubricating fluid after it has passed over the shafts by simply coupling the hose 25 to the vacuum side of pump 22. This will, of course, prevent the fluid from introducing any contamination into the operational system.

Whereas one quite simplified structure for scavenging the lubricating fluid is disclosed in FIGS. 2 and 3, it is appreciated that other more sophisticated designs could likewise be utilized. For example, a scavenging plate such as is illustrated by the dashed lines 61 could be positioned at the outer end of the center pole 48 and a passageway such as shown by the dashed lines 63 could be provided to couple the exhausting groove 40 to plate 61. Although somewhat more complicated than that previously described, this alternative might provide slightly better collection of the bearing fluid.

In operation, the above-described embodiment has been found to allow precision positioning of a plurality of recorder heads virtually free of friction drag forces and without any measurable head pitching. Furthermore, the present invention has been found to readily resist the normal yaw-inducing forces applied to the heads by the drag interrelationship occurring between the heads and the spinning disks. These improvements are believed to be the result of having the head-driving forces and movement restraining forces symmetrically disposed about a single longitudinal axis.

Among the many possible variations of the present invention which are contemplated are the following: the head carriage 90 could be mounted on the opposite ends of the shafts 74, 76, instead of using two main shafts, a single shaft and associated bearing sleeve of possible elliptical or quasi-rectangular transverse cross section could be used; the stator and/or armature cross-sectional configuration could be other than round; and the air-bearing sleeves could be made integral with the shafts and slide in smooth stator bores with the pressurized air being applied to the sleeves or their equivalents through the shafts. Furthermore, it is anticipated that in certain applications it may be desirable to rotate the head carriage 90° so as to accommodate vertically disposed disks, i.e., disks which are mounted to rotate about a horizontal axis rather than a vertical axis.

Although other alterations and modifications of the present invention will no doubt become apparent to those skilled in the art after having read the above detailed description, it is to be understood that this disclosure is made for purposes of illustration only, and it is intended that the appended claims cover all such alterations and modifications as fall within the true spirit and scope of the invention.

What is claimed is:

1. Head-positioning apparatus for magnetic recorders comprising:

a stator assembly including a magnetic field generating structure having an axially-extending, generally cylindrical, armature coil-receiving recess formed concentric with the longitudinal axis of the stator assembly and circumscribing a first part thereof, and means forming at least one passageway extending through said stator assembly in symmetrical disposition relative to said longitudinal axis;

an armature assembly including elongated shaft means extending through said passageway, armature coil means, an elongated generally cylindrical coil support means having one end affixed to one end of said shaft means and the other end carrying said coil means axially along and within said recess, and carriage means affixed to said shaft means at least one recording head for movement over the surface of a recording media; and means providing a balanced flow of lubricating fluid between the surfaces of said passageway and the shaft means extending therethrough such that when predetermined electrical signal is applied to said coil means said armature means will be moved to a predetermined position relative to said stator means and such movement will be accomplished substantially free of any mechanical contact friction forces.

2. Head-positioning apparatus as recited in claim 1 wherein said passageway-forming means provides first and second passageways, the two passageways being disposed on opposite sides of said longitudinal axis, and wherein said shaft means includes first and second elongated shafts respectively extending through said first and second passageways.

3. Head-positioning apparatus as recited in claim 1 wherein said passageway-forming means includes an apertured tube-like sleeve disposed within a bore passing through said first part of said stator assembly such that the outer surface of said sleeve cooperates with the surface of said bore to direct an externally supplied flow of pressurized fluid through the apertures in said sleeve, and wherein the internal surface of said sleeve provides said passageway.

4. Head-positioning apparatus as recited in claims 1, 2 or 3 wherein said carriage means includes means for clampingly engaging a plurality of head-carrying arms.

5. Head-positioning apparatus as recited in claim 2 wherein each of said first and second passageways is formed by an apertured cylindrical sleeve disposed within a bore extending through said first part of said stator assembly, and wherein said balanced flow providing means includes a plurality of grooves formed in the outer surface of said sleeve, such grooves extending from a fluid flow receiving reservoir formed between said bore and a portion of the outer surface of said sleeve to respective ones of the apertures in said sleeve to direct the fluid flow in equal amounts to said apertures.

6. Head-positioning apparatus as recited in claim 5 wherein said apertures are arranged in pairs along said sleeve such that the apertures of a particular pair are centered on a diameter transverse to the longitudinal axis of said sleeve.

7. Head-positioning apparatus as recited in claim 6 wherein no two pairs of apertures lie in the same transverse plane.

8. Head-positioning apparatus as recited in claims 1, 2, 3 or 7 wherein said stator assembly further includes a three-point adjustable aligning means for aligning and securing it to the chassis of the recorder.

9. Head-positioning apparatus as recited in claim 1 wherein said armature assembly further includes an armature position indicating means attached to the other end of said shaft means.

10. Head-positioning apparatus as recited in claim 1 and further comprising means for collecting said lubricating fluid after it has passed between said passageway and said shaft means.

* * * * *